United States Patent
Gage et al.

(10) Patent No.: US 7,949,218 B2
(45) Date of Patent: May 24, 2011

(54) WAVEGUIDE FOR HEAT ASSISTED MAGNETIC RECORDING

(75) Inventors: Edward Charles Gage, Mars, PA (US); William Albert Challener, Sewickley, PA (US); Mary Cynthia Hipwell, Edina, MN (US); David Allen Sluzewski, Eagan, MN (US); Michael Allen Seigler, Pittsburgh, PA (US); Xuhui Jin, Pittsburgh, PA (US); Yiao-Tee Hsia, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 120 days.

(21) Appl. No.: 12/031,045

(22) Filed: Feb. 14, 2008

(65) Prior Publication Data

US 2009/0208171 A1 Aug. 20, 2009

(51) Int. Cl.
*G02B 6/26* (2006.01)
*G02B 6/34* (2006.01)
*G02B 6/42* (2006.01)
*G03B 15/02* (2006.01)
*G03H 1/02* (2006.01)
*G03H 1/28* (2006.01)

(52) U.S. Cl. .............. 385/50; 385/27; 385/37; 359/34

(58) Field of Classification Search .......... 385/27–30, 385/37, 39, 50; 369/13.02, 13.32, 44.11, 369/44.17; 359/5, 34

See application file for complete search history.

(56) References Cited

U.S. PATENT DOCUMENTS

| | | | |
|---|---|---|---|
| 4,865,407 A | 9/1989 | Suzuki et al. | |
| 5,124,961 A | 6/1992 | Yamaguchi et al. | |
| 5,440,530 A | 8/1995 | Fedeli et al. | |
| 5,889,641 A | 3/1999 | Belser et al. | |
| 6,282,219 B1 * | 8/2001 | Butler et al. | 372/50.1 |
| 6,307,832 B1 | 10/2001 | Novotny et al. | |
| 6,320,841 B1 | 11/2001 | Watanabe et al. | |
| 6,324,129 B1 | 11/2001 | Durnin et al. | |
| 6,360,038 B1 * | 3/2002 | Grubsky | 385/28 |
| 6,944,101 B2 | 9/2005 | Johns et al. | |
| 6,944,112 B2 | 9/2005 | Challener | |
| 6,956,796 B2 * | 10/2005 | Ma et al. | 369/44.19 |
| 6,996,033 B2 * | 2/2006 | Dugas et al. | 369/13.17 |
| 7,069,568 B2 | 6/2006 | Coehoorn et al. | |
| 7,483,229 B2 * | 1/2009 | Rausch et al. | 360/59 |
| 2004/0120064 A1 | 6/2004 | Dugas et al. | |
| 2005/0122850 A1 | 6/2005 | Challener et al. | |
| 2005/0157595 A1 * | 7/2005 | Tawa et al. | 369/13.02 |
| 2005/0190682 A1 * | 9/2005 | Gage et al. | 369/112.29 |
| 2005/0265139 A1 | 12/2005 | Gomez et al. | |
| 2006/0143635 A1 * | 6/2006 | Liu et al. | 720/659 |
| 2006/0233061 A1 | 10/2006 | Rausch et al. | |
| 2006/0233062 A1 | 10/2006 | Bedillion et al. | |
| 2006/0239605 A1 * | 10/2006 | Palen et al. | 385/14 |
| 2007/0230288 A1 * | 10/2007 | Nishida et al. | 369/13.13 |
| 2008/0002529 A1 * | 1/2008 | Sekine et al. | 369/13.33 |

* cited by examiner

*Primary Examiner* — Rhonda S Peace (74) *Attorney, Agent, or Firm* — Robert P. Lenart, Esq.; Pietragallo Gordon Alfano Bosick & Raspanti, LLP (57) ABSTRACT

An apparatus includes a slider mounted on an arm, a first waveguide including a first core guiding layer, a second waveguide mounted on the slider and including a second core guiding layer having a thickness smaller than the thickness of the first core guiding layer, and a coupler for coupling light from the first core guiding layer to the second core guiding layer.

12 Claims, 9 Drawing Sheets

WAVEGUIDE FOR HEAT ASSISTED MAGNETIC RECORDING

BACKGROUND

Heat assisted magnetic recording (HAMR) requires that a thermal source be brought into close proximity to a magnetic writer. HAMR designs utilize an intense near field optical source to elevate the temperature of the storage media. When applying a heat or light source to the medium, it is desirable to confine the heat or light to the track where writing is taking place and to generate the write field in close proximity to where the medium is heated to accomplish high areal density recording.

In addition, for heat assisted magnetic recording (HAMR) one of the technological hurdles to overcome is to provide an efficient technique for delivering large amounts of light power to the recording medium confined to spots of, for example, 50 nm or less. A variety of transducer designs have been proposed for this purpose.

SUMMARY

In a first aspect, the invention provides an apparatus including a slider mounted on an arm, a first waveguide including a first core guiding layer, a second waveguide mounted on the slider and including a second core guiding layer having a thickness smaller than the thickness of the first core guiding layer, and a coupler for coupling light from the first core guiding layer to the second core guiding layer.

In another aspect, the invention provides an apparatus including a slider mounted on an arm, a first waveguide including a first core guiding layer, a second waveguide mounted on the slider and including a second core guiding layer, wherein the second core guiding layer includes a first portion, a second portion, and a tapered portion between the first and second portions, and a coupler for coupling light from the first core guiding layer to the first portion of the second core guiding layer.

In another aspect, the invention provides an apparatus including a slider mounted on an arm, a first waveguide including a first core guiding layer, and a second waveguide mounted on the slider and including a second core guiding layer wherein portions of the first core guiding layer and the second core guiding layer are positioned adjacent to each other such that light in the first core guiding layer is evanescently coupled to the second core guiding layer.

In another aspect, the invention provides an apparatus including a slider mounted on an arm, a first waveguide supported by the arm, a second waveguide mounted on the slider, and a coupler for coupling light from the first waveguide to the second waveguide, wherein the coupler comprises a polymer pillar.

These and various other features and advantages will be apparent from a reading of the following detailed description.

DETAILED DESCRIPTION OF THE INVENTION

In one aspect, this invention relates to optical devices, and more particularly to optical devices that can be used in recording heads used in data storage devices. In another aspect, the invention encompasses devices that can be used in heat assisted magnetic recording or optical recording, as well as disc drives that include the devices.

In various aspects, this invention provides an apparatus including an optical waveguide for light delivery to a data storage medium without the need for active alignment of the optical components. Such an apparatus can be used in heat assisted magnetic recording or optical recording devices.

Figure 1:
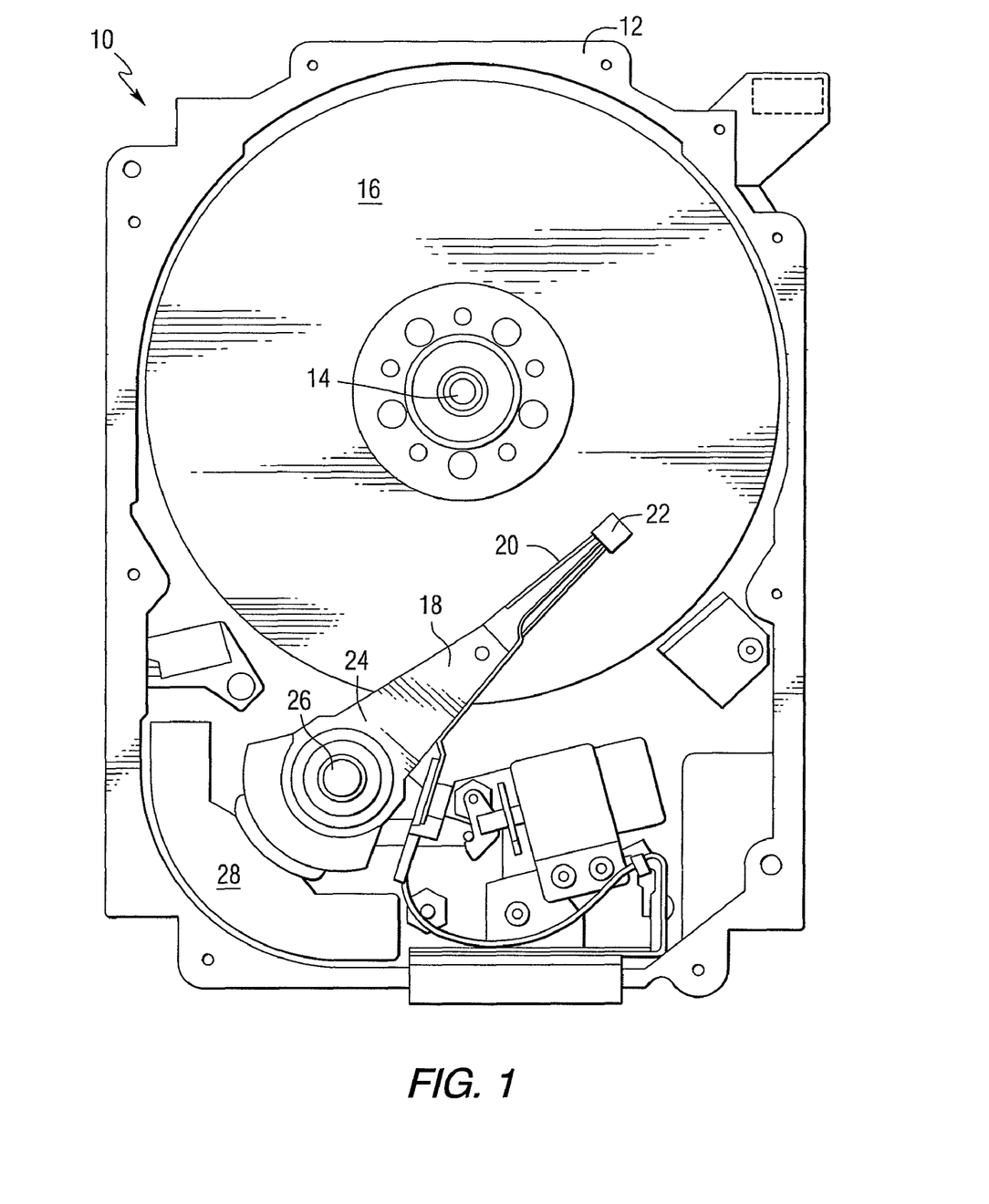
FIG. 1 is a pictorial representation of a data storage device in the form of a disc drive that can include a waveguide and slider constructed in accordance with an aspect of this invention.

FIG. 1 is a pictorial representation of a data storage device in the form of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For heat assisted magnetic recording, electromagnetic radiation is used to heat a portion of a surface of a magnetic storage medium. This facilitates the subsequent recording of magnetic information in the heated portion of the medium. Heat assisted magnetic recording heads include a component for directing electromagnetic radiation onto the surface of the storage medium, and an associated component for producing a magnetic signal for affecting the magnetization of the storage medium.

Figure 2:
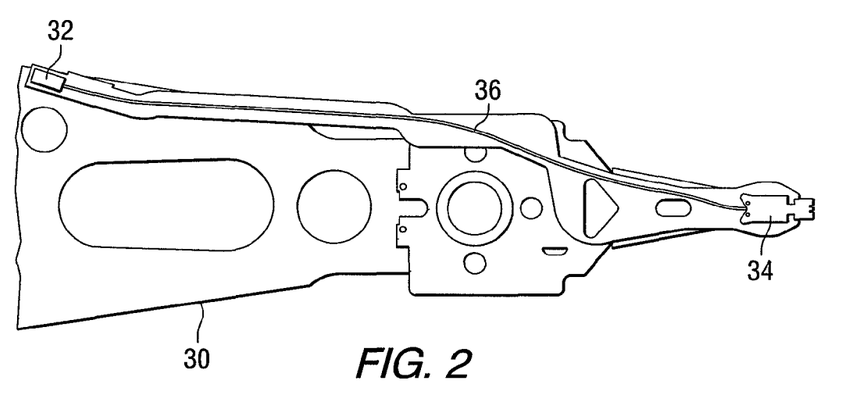
FIG. 2 is a schematic representation of an apparatus constructed in accordance with an aspect of the invention.

FIG. 2 is a plan view of an actuator arm 30, a laser module 32 and a slider 34. A flexible first waveguide 36 is used to conduct electromagnetic radiation from the laser module to the slider, where it is coupled into a second waveguide on the slider and directed onto an adjacent data storage medium.

The electromagnetic radiation can be in the form of infrared, visible light or ultraviolet radiation. For the purposes of this description, such electromagnetic radiation is generically referred to as light.

Figure 3:
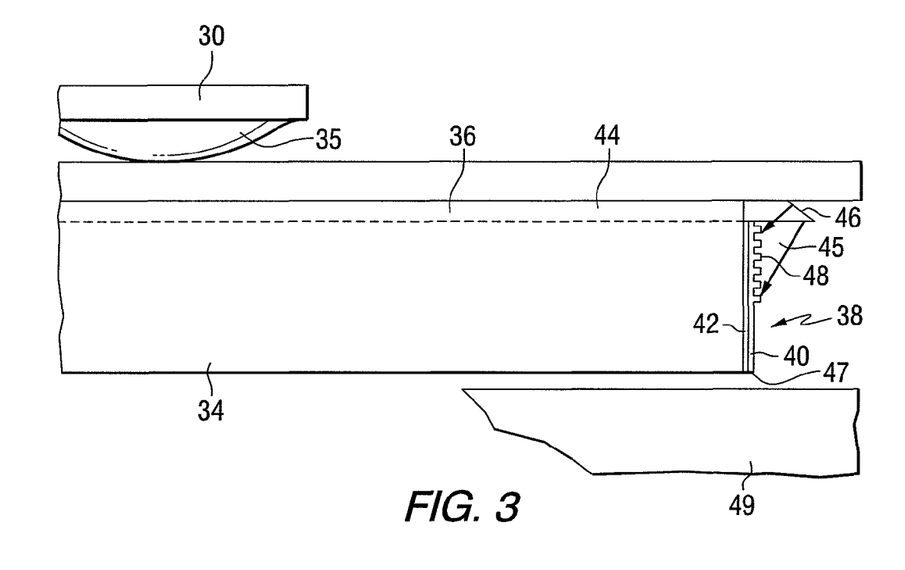
FIG. 3 is a schematic side view of an apparatus constructed in accordance with another aspect of the invention.
Figure 4:
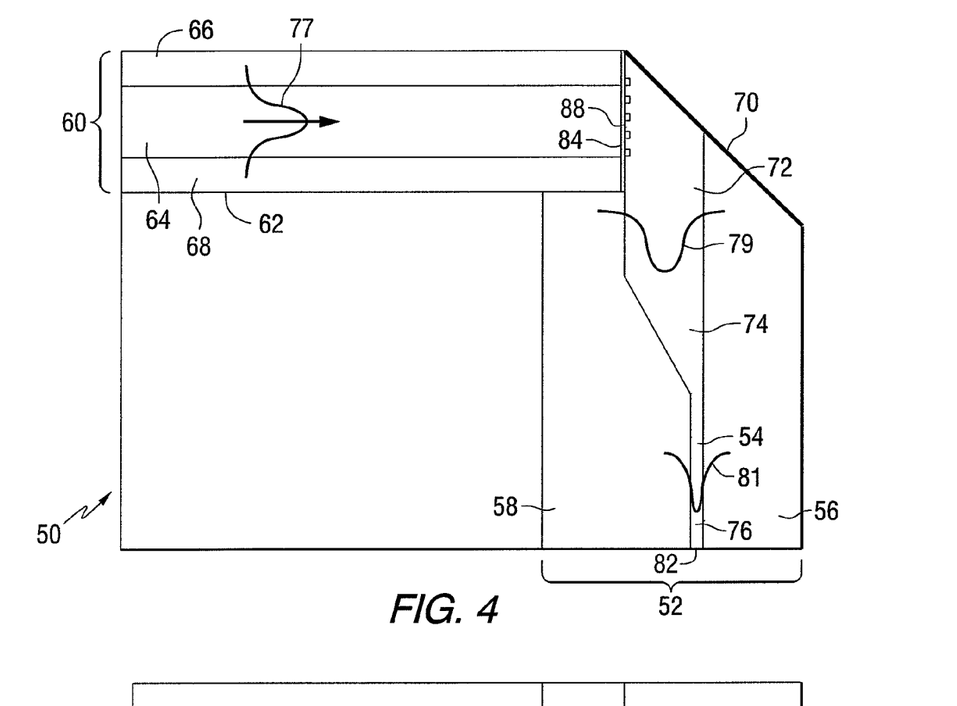
FIG. 4 is a schematic side view of an apparatus constructed in accordance with another aspect of the invention.
Figure 5:
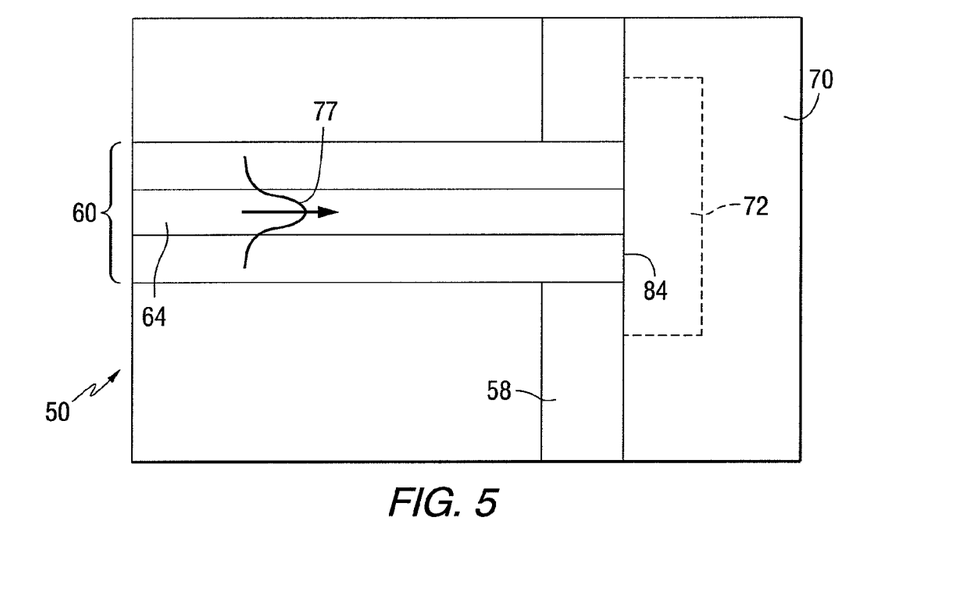
FIG. 5 is a schematic top view of the apparatus of FIG. 4.
Figure 6:
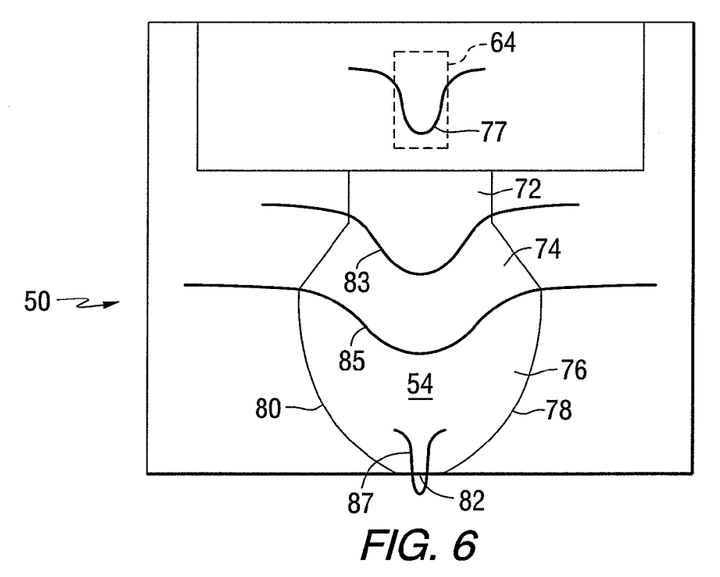
FIG. 6 is a schematic end view of the apparatus of FIG. 4.

FIG. 3 is a schematic side view of an apparatus constructed in accordance with another aspect of the invention. In this example, the slider 34 is coupled to a portion of the arm 30 by an adhesive 35. A portion of the flexible waveguide 36 includes a first core guiding layer 44 and is positioned on or in the slider. A second waveguide 38 is mounted on or in the slider. The second waveguide includes a second core guiding layer 40 and a cladding layer 42. A coupling structure is provided to transfer light from the first core guiding layer to the second core guiding layer. In this example, the coupling structure includes a mirror 46 formed on an end of the first core guiding layer and a grating 48 formed adjacent to or in the second core guiding layer. Light 45 is reflected by the minor onto the grating. The thickness of the first core guiding layer is larger than the thickness of the second core guiding layer. The minor can be positioned and shaped to focus or defocus the light to improve coupling of the light into the second waveguide. The light that is coupled into the second waveguide exits an end 47 of the second waveguide to heat a portion of an adjacent storage medium 49. The slider can include other components including magnetic write and read components as are known in the art. FIG. 4 is a side view, FIG. 5 is a top view, and FIG. 6 is an end view, of a slider 50 according to another aspect of the invention. The slider includes a trailing waveguide 52 having a core guiding layer 54 and first and second cladding layers 56 and 58. A portion of a flexible waveguide 60 is positioned adjacent to a surface 62 of the slider. The flexible waveguide includes a core guiding layer 64 and first and second cladding layers 66 and 68. A turning minor 70 is positioned adjacent to an end of the core layer of the trailing waveguide and reflects light from the flexible waveguide into the trailing waveguide. In this example the core layer of the trailing waveguide includes a first section 72, a second section 74, and a third section 76. The first section is thicker than the third section. The first and third sections are connected by the second section, which is tapered. Lines 77, 79 and 81 represent the propagation mode of the light in the guiding layers. The guiding layer 64 of the flexible waveguide is thicker than the third section 76 of the guide layer of the trailing waveguide.

It is desirable to match the propagation mode in the trailing waveguide to the propagation mode in the flexible waveguide. Mode matching can be achieved using a tapered slider waveguide. Tapering the waveguide converts the light from one mode to another mode. The mode in the flexible waveguide and thick portion of the waveguide on the slider, may not match exactly, but they will match better than if the flexible waveguide passes light directly to a thin waveguide. The tapered section will convert the mode from the thick portion mode to the thin portion mode. In the example of FIG. 4, the tapered section 74 of the guiding layer of the trailing waveguide performs the desired mode conversion between the first and third section of the guiding layer of the trailing waveguide.

As shown in FIG. 6, the third section of the core layer of the trailing waveguide can include curved edges 78 and 80, which can be in the shape of a parabola. The edges of the core reflect light to a focal region 82. An end 84 of the flexible waveguide is positioned to project light into section 72 of the guiding layer of the trailing waveguide. Lines 83, 85 and 87 illustrate the propagation of light in the trailing waveguide. The trailing waveguide is mounted to direct light in a direction that is substantially perpendicular to the direction of light propagation near the end of the flexible waveguide. The trailing waveguide can form a solid immersion mirror (SIM). In one example, an antireflective coating 88 can be provided near the end 84 of waveguide 60.

The flexible waveguide can be constructed of materials such that the difference between the index of refraction of the core and cladding is small compared to the waveguide on the back of the slider. With this smaller difference, the core of the flexible waveguide needs to be thicker in order to still guide the light. In one example, section 72 can have a thickness similar to the flexible waveguide. For example, the thickness could be in a range from about 1 µm to about 10 µm. In other examples, it could be thicker/wider, while still providing "single mode" transmission, i.e., there is only one electric field distribution that can propagate in the waveguide.

As stated above, the flexible waveguide may be about 1 to about 10 µm wide, and the portion labeled 76 in FIG. 6 can have a width of, for example, 50 µm, so it may be desirable to let the light diverge some first. However, this may not necessarily be the case. Also, while sections 72, 74, and 76 in FIG. 4 may correspond to sections 72, 74 and 76 in FIG. 6, in other examples, these items may be different in FIGS. 4 and 6. For example, the waveguide could be tapered down in one direction first, and then expanded in the other direction. For example, the functions of sections 72 and 74 in FIG. 4 could take place in section 72 of FIG. 6.

The core guiding layers of the flexible waveguide can be, for example, polymethylmethacrylate, polystyrene, polycarbonate, or silicone polymers such as polysiloxanes or siloxanes. The core guiding layers of the waveguide on the slider can be, for example, $SiO_2$, SiON, MgF, $Ta_2O_5$, $TiO_2$, SiN, $HfO_2$, $ZrO_2$, AlN or $Al_2O_3$.

The cladding layers of the waveguides can be, for example, polymethylmethacrylate, polystyrene, polycarbonate, or silicone polymers such as polysiloxanes or siloxanes.

The mirror can be an etched or mounted device having a high reflectivity, such as vacuum deposited Au, Cu, Ni, Rh, Cr, Ag or Al. The mirror can be coated with a low index dielectric enhancement such as $Al_2O_3$, MgF, $SiO_2$ or $Ta_2O_5$ to boost reflectivity.

Figure 7:
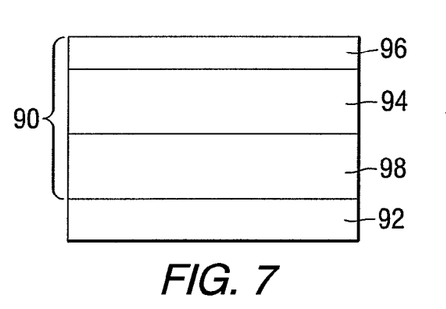
FIGS. 7, 8, 9 and 10 are schematic side views of a waveguide that can be used in apparatus constructed in accordance with various aspects of the invention.
Figure 8:
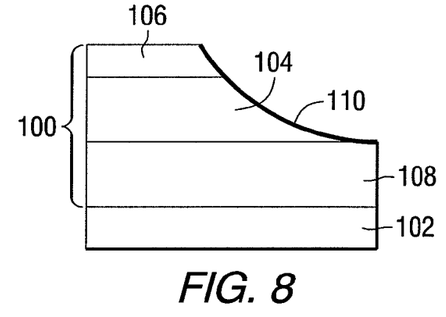

FIGS. 7, 8, 9 and 10 are side views of portions of waveguides that can be used in other aspects of the invention. In FIG. 7, a waveguide 90 is mounted on a substrate 92, and includes a core layer 94 positioned between two cladding layers 96 and 98. FIG. 8 shows a waveguide 100 mounted on a substrate 102, and including a core layer 104 positioned between two cladding layers 106 and 108. The core layer 104 and top cladding layer 308 terminate in a curved surface 110. The curved surface can form a mirror that is formed in the waveguide. The curved surface can be shaped to focus or defocus the light that is reflected into the core guiding layer of the waveguide. An etching process can be used to form the curved surface. The angle of the etch can be varied to produce the desired curvature.

Figure 9:
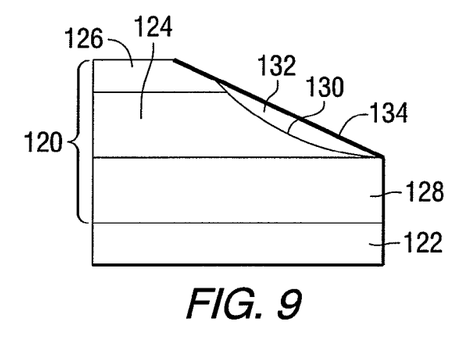

FIG. 9 shows a waveguide 120 mounted on a substrate 122, and including a core layer 124 positioned between two cladding layers 126 and 128. The core layer 124 terminates in a curved surface 130. A filler material 132 can be located adjacent to the curved surface 130 to form a lens. In this example, the filler material has a flat side 134. The filler material can be selected from a wide range of materials, such as a polymer, metal oxide dielectric, metal, semiconductor, etc. FIG. 9 shows that the mirror or lens can be formed in one of the waveguides. The shape of the mirror can be chosen to focus or defocus the light to optimize coupling of the light from the flexible waveguide to the trailing waveguide. The mirror can be used to direct light onto an end of a core guiding layer or onto a grating to couple the light into the core guiding layer.

Figure 10:
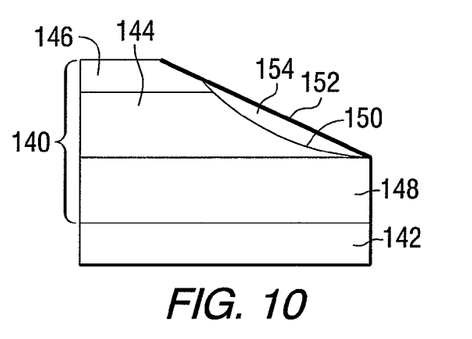

FIG. 10 shows a flexible waveguide 140 mounted on a substrate 142, and including a core layer 144 positioned between two cladding layers 146 and 148. The core layer 144 terminates in a curved surface 150. A planar mirror 152 is located adjacent to the curved surface 150 and forms a cavity 154 between the curved surface 150 and the mirror 152.

Figure 11:
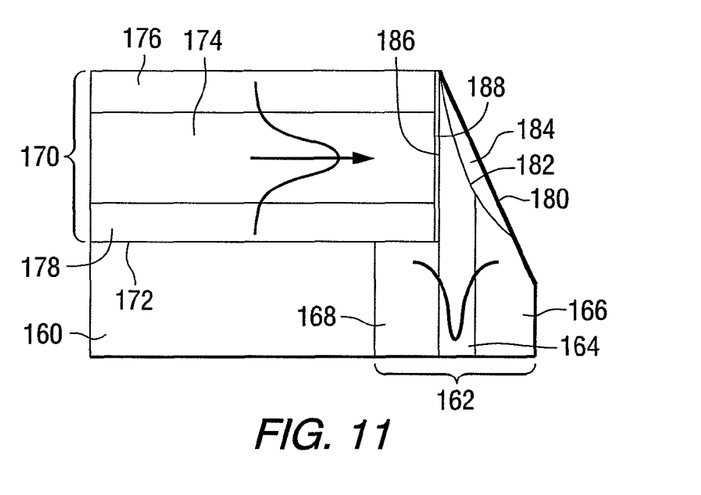
FIG. 11 is a schematic side view of an apparatus constructed in accordance with another aspect of the invention.

FIG. 11 is a side view of a slider 160 according to another aspect of the invention. The slider includes a trailing waveguide 162 having a core guiding layer 164 and first and second cladding layers 166 and 168. A flexible waveguide 170 is positioned adjacent to a surface 172 of the slider. The flexible waveguide includes a core guiding layer 174 and first and second cladding layers 176 and 178. A turning mirror 180 reflects light from the flexible waveguide into the trailing waveguide. In this example, the turning mirror includes a curved surface 182 to improve coupling of the light into the trailing waveguide. A filler material 184 is positioned between the mirror and the curved surface. An end 186 of the flexible waveguide is positioned adjacent to the guiding layer of the trailing waveguide. The trailing waveguide is mounted to direct light in a direction that is substantially perpendicular to the direction of light propagation near the end of the flexible waveguide. An antireflection coating 188 could be positioned adjacent to the end 186 of the flexible waveguide.

Figure 12:
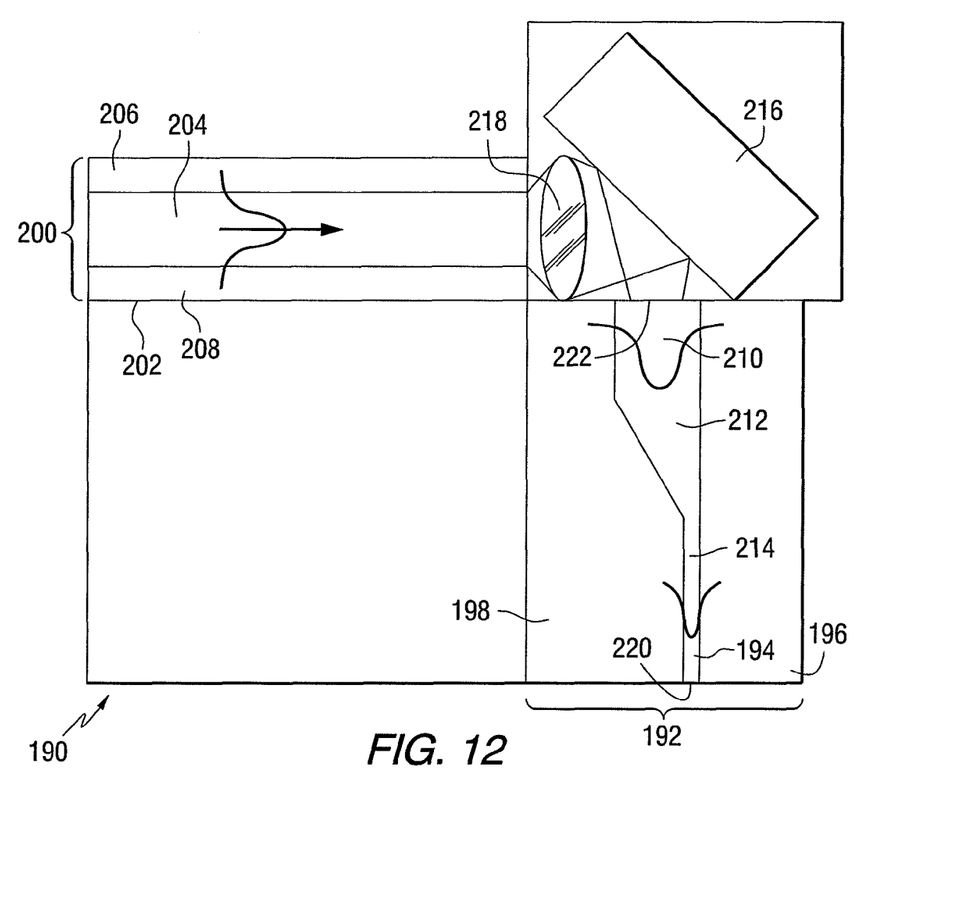
FIG. 12 is a schematic side view of an apparatus constructed in accordance with another aspect of the invention.

As shown in FIG. 12, the tapered core could also be used in conjunction with other coupling or turning methods, such as a bulk mirror and/or lens to turn the light from the flexible waveguide and focus it into a wide portion of the slider trailing waveguide, which is then tapered down.

FIG. 12 is a side view of a slider 190 according to another aspect of the invention. The slider includes a trailing waveguide 192 having a core guiding layer 194 and first and second cladding layers 196 and 198. A flexible waveguide 200 is positioned adjacent to a surface 202 of the slider. The flexible waveguide includes a core guiding layer 204 and first and second cladding layers 206 and 208. In this example the core layer 196 of the trailing waveguide includes a first portion 210, a second section 212, and a third section 214. The first section is thicker than the third section. The first and third sections are connected by the second section, which is tapered. Light is transmitted from the flexible waveguide core guiding layer to a turning mirror 216 and reflected to an end 222 of the core guiding layer of the trailing waveguide. A lens 218 is provided to focus the light onto the mirror. The edges of the second core guiding layer can be shaped to reflect light to a focal region 220, similar to the edges of the core guiding layer in FIG. 6.

Figure 13:
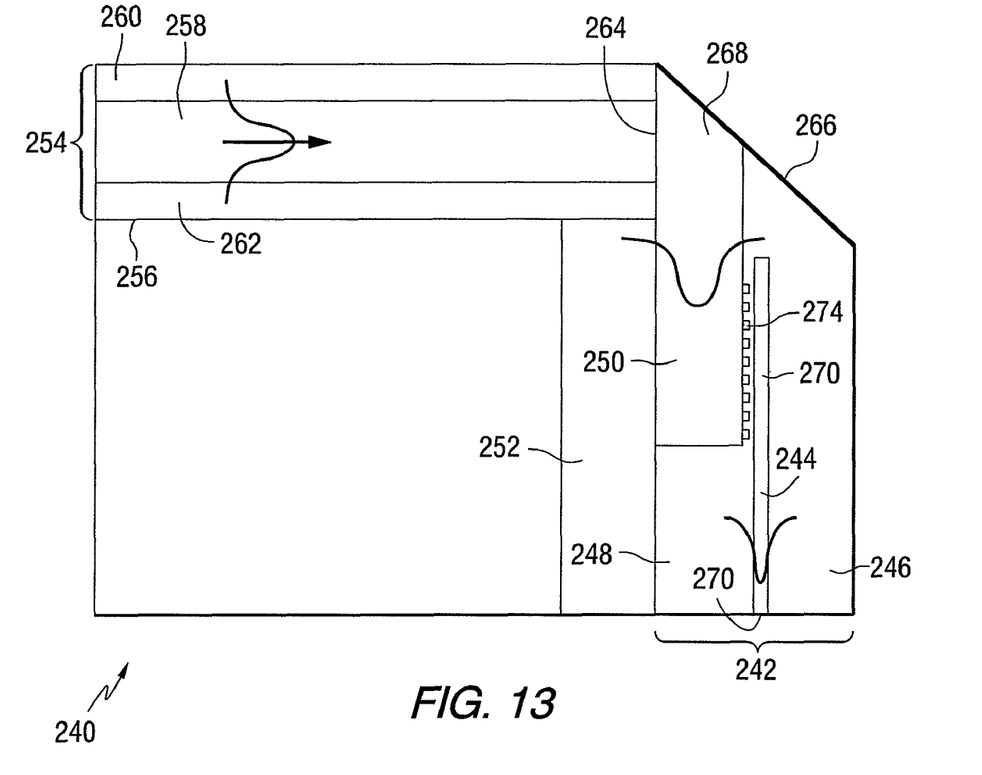
FIG. 13 is a schematic side view of an apparatus constructed in accordance with another aspect of the invention.

FIG. 13 is a side view of a slider 240 according to another aspect of the invention. The slider includes a trailing waveguide 242 having a first core guiding layer 244 and first and second cladding layers 246 and 248. The trailing waveguide further includes a second core guiding layer 250 positioned between cladding layer 246 and another cladding layer 252. A portion of a flexible waveguide 254 is positioned adjacent to a surface 256 of the slider. The flexible waveguide includes a core guiding layer 258 and first and second cladding layers 260 and 262. An end 264 of the flexible waveguide is positioned to direct light into the second core guiding layer 250.

A turning mirror 266 reflects light from the flexible waveguide into a portion 268 of the second core guiding layer. The trailing waveguide further includes another core guiding layer 270. Portions of the core guiding layers 250 and 270 are positioned adjacent to each other to provide evanescent coupling of the light between the two core guiding layers. Core guiding layer 250 is thicker than core guiding layer 270. The edges of core guiding layer 270 can be shaped to reflect light to a focal region 272. In another example, a grating 274 can be positioned between core guiding layers 250 and 270 to enhance coupling between the core guiding layers.

In the example of FIG. 13, a turning mirror is used in conjunction with evanescent coupling. A grating can also be placed between the two waveguides to decrease the coupling length. With this type of evanescent coupler being built at the wafer level, the coupling can be closely controlled.

Figure 14:
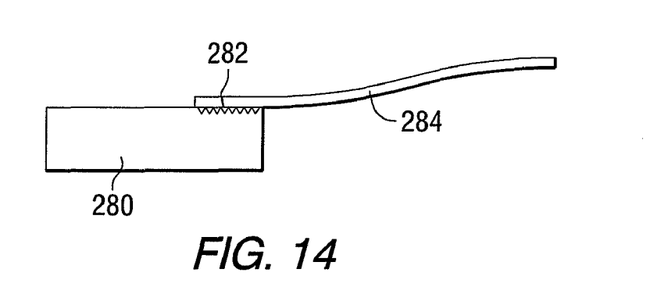
FIG. 14 is a schematic side view of an apparatus constructed in accordance with another aspect of the invention.

A laser module can be used to produce the light that is coupled into the flexible waveguide. FIG. 14 is a schematic representation of a laser diode 280 with a grating coupler 282 for coupling light from the laser diode to a flexible waveguide 284.

Each of the examples described above includes a flexible waveguide or fiber to transmit light from the light source to the slider. The flexible waveguide can be positioned in a channel that is etched into the top of the slider. This channel will help the alignment process. The turning mirror can be formed on the upper side of the slider at the wafer or bar level. The turning mirror turns and couples the light from the flexible waveguide to the slider trailing waveguide.

In the examples of FIGS. 4 and 12, the core guiding layer of the initial or top part of the slider trailing waveguide is made thicker to allow for better mode matching, thus better coupling, and easier alignment. The width of the slider trailing waveguide can also be wider than the width of the flexible waveguide to allow for a reasonable alignment tolerance. The slider trailing waveguide core is then tapered from the thick region, on the order of μm's, to a much thinner core (e.g., about 100 nm). The bottom portion of the trailing waveguide can be shaped to form a solid immersion mirror (SIM). Depending on the width of the flexible waveguide and the SIM size, the slider trailing waveguide may also need to be tapered in the plane of the slider trailing waveguide to make it wider to fill the SIM. The SIM would then focus the light to the focal region.

Several of the described examples provide a large tolerance for the alignment. The input slider trailing waveguide dimensions can be relatively large. The alignment can be effectively achieved in both directions by tapering the slider trailing waveguide from large dimensions to small dimensions. If the tapering is done gradually enough, little to no light should be lost. Sharp bends in the flexible waveguide are not required to couple the light from the flexible to the slider trailing waveguide.

The coupling may be improved by matching the mode index and profile between the flexible waveguide and slider trailing waveguide, for example by using similar index materials and dimensions. A matching mode profile may be able to be engineered by using the right combination of materials even if they aren't the same materials.

A convex or concave lens or mirror could also be fabricated by varying the angle during the sloped wall etch for the turning mirror and then either metallizing it directly or by filling it with a dielectric material of higher or lower refractive index and then metallizing it. The curvature can be controlled by adjusting the rate at which the ion mill angle is changed during the etch. A second sloped wall may be formed behind the first, where the second slope has a different curvature.

Figure 15:
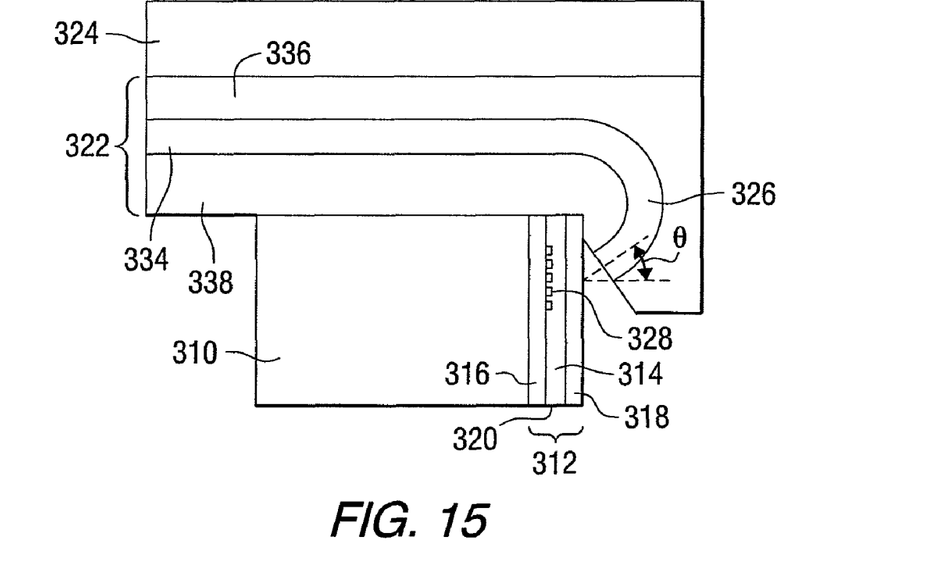
FIG. 15 is a schematic side view of an apparatus constructed in accordance with another aspect of the invention.
Figure 16:
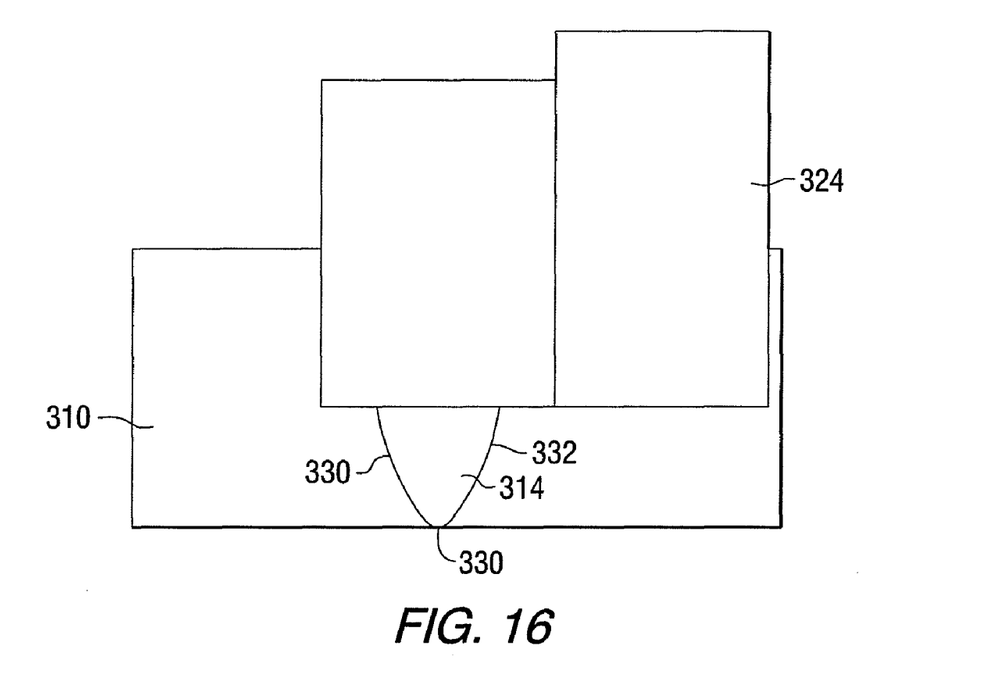
FIG. 16 is a schematic end view of the apparatus of FIG. 15.

FIG. 15 is a side view, and FIG. 16 is an end view, of a slider 310 according to another aspect of the invention. In this aspect, the slider includes a trailing waveguide 312 in the form of a planar solid immersion mirror having a guiding layer 314 and cladding layers 316 and 318. The guiding layer has curved edges 330 and 332, which can be in the shape of a parabola, to direct light to a focal point 320. A waveguide 322, which can be mounted on an arm 324, includes a core guiding layer 334 and cladding layers 336 and 338. A curved portion 326 of the core guiding layer directs light onto a grating coupler 328 in the trailing waveguide. The light is directed onto the coupler at an angle θ.

The grating couplers can include a plurality of parallel grooves or ridges that extend in a direction substantially parallel to a plane of a magnetic medium. The optical components and relative positions of those components are chosen such that light transmitted through the optical fiber and lens, and reflected by the mirror is focused onto the grating. Both the grating and waveguide are polarization sensitive. The polarization of the light can be parallel to the grooves of the grating for transmission of the transverse electric (TE) mode in the waveguide. The beam is brought to a soft focus, of for example 60 µm diameter, to cover the grating surface with a numerical aperture of about 0.01. In another example, a transverse magnetic (TM) mode can be used, wherein the light polarization projected into the plane of the grating is perpendicular to the gratings.

Figure 17:
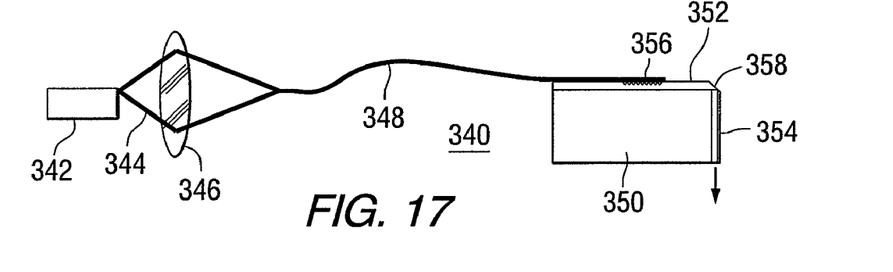
FIG. 17 is a schematic representation of an apparatus constructed in accordance with another aspect of the invention.

FIG. 17 is a schematic representation of an apparatus 340 in accordance with another aspect of the invention. The apparatus includes a source 342 of electromagnetic radiation such as a laser diode that produces light 344. The light passes through a focusing element 346, such as a lens or telescope, and is directed into a flexible waveguide 348. The waveguide can be mounted on, or embedded in, an arm, not shown in this view. The waveguide extends to a slider 350. In this example, the slider includes a top waveguide 352 and a trailing waveguide 354. Light from waveguide 348 is coupled into the top waveguide, using for example, a grating coupler 356 or evanescent coupling. A lapped turning mirror 358 reflects light exiting the top waveguide, and directs the light into the trailing waveguide.

Figure 18:
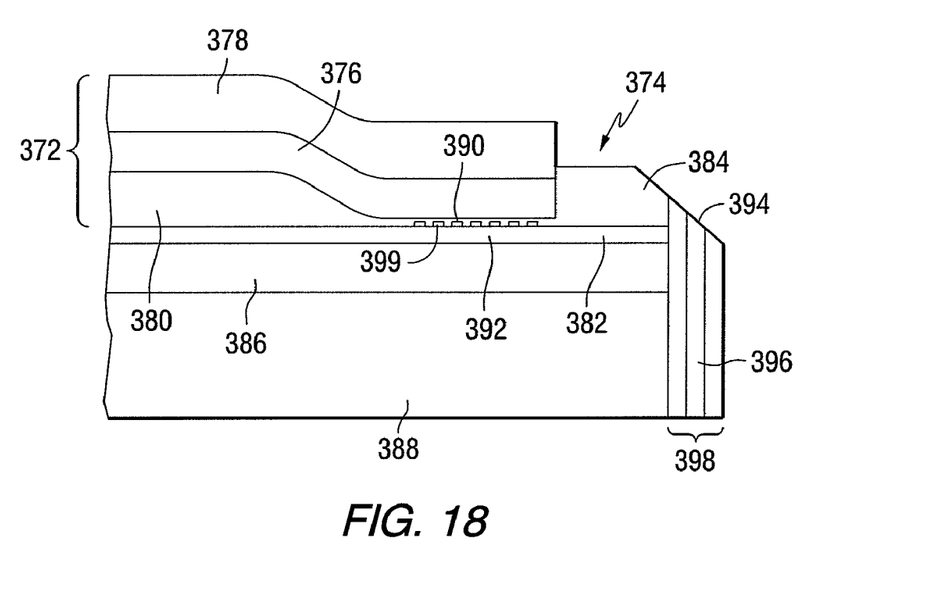
FIG. 18 is a schematic side view of an apparatus constructed in accordance with another aspect of the invention.

FIG. 18 is a schematic representation of an apparatus 370 that illustrates a structure for providing evanescent coupling between two waveguides 372 and 374. Waveguide 372 includes a core guiding layer 376 between cladding layers 378 and 380. Waveguide 374 includes a core guiding layer 382 between cladding layers 384 and 386. Waveguide 374 is supported by a slider 388. A portion 390 of core guiding layer 376 is positioned adjacent to a portion 392 of core guiding layer 382, such that light in core guiding layer 376 is evanescently coupled into core guiding layer 382. The light then propagates in core guiding layer 382 and is reflected by a mirror 394 into a trailing waveguide 396.

Figure 19:
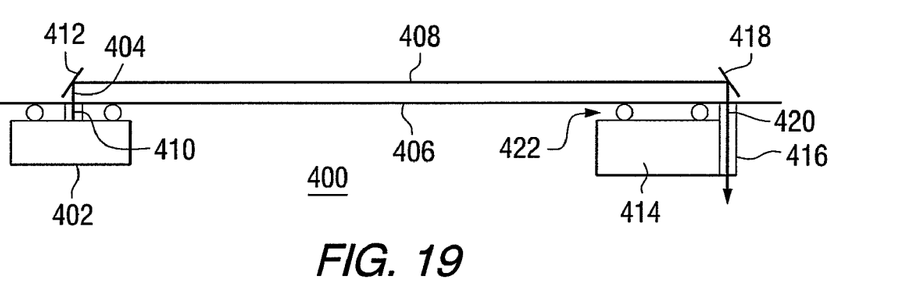
FIGS. 19-21 are schematic representations of apparatus constructed in accordance with various aspects of the invention.

FIG. 19 is a schematic representation of an apparatus 400 in accordance with another aspect of the invention. The apparatus includes a source 402 of electromagnetic radiation such as a laser diode that produces light 404. The light source in this example is a VCSEL. The VCSEL is mounted on an arm 406, which also supports a waveguide 408. Light from the source passes through a polymer pillar 410. A mirror 412 reflects light into the waveguide. The waveguide can be mounted on, or embedded in, the arm. The waveguide extends to a slider 414. In this example, the slider includes a trailing waveguide 416. A turning mirror 418 reflects light exiting the waveguide 408, and directs the light into the trailing waveguide. Another polymer pillar 420 is positioned between the mirror 418 and the trailing waveguide. The polymer pillars limit divergence of the light as it passes through the pillars. The slider is coupled to the arm by a gimbal assembly 422. The polymer pillars can be made of, for example, polymethylmethacrylate, polystyrene, polycarbonate, or silicone polymers such as polysiloxanes or siloxanes.

Figure 20:
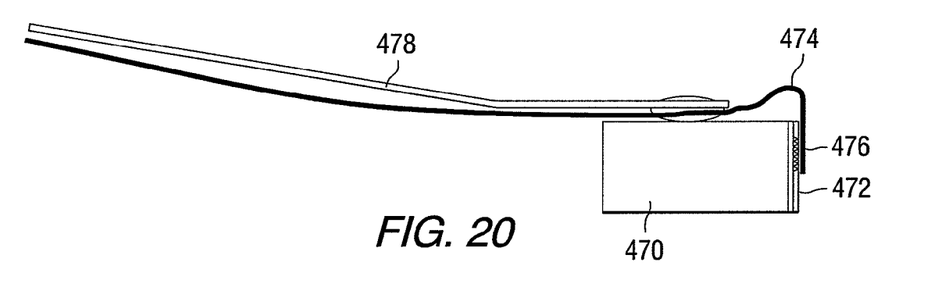

FIG. 20 shows a slider 470 having a trailing waveguide 472. In this example, the flexible waveguide 474 is shaped such that a portion 476 of the flexible waveguide lies adjacent to the trailing waveguide 472. Light in the flexible waveguide 474 is evanescently coupled into the trailing waveguide. The waveguide 474 is supported by, or integral with, an arm 478.

Figure 21:
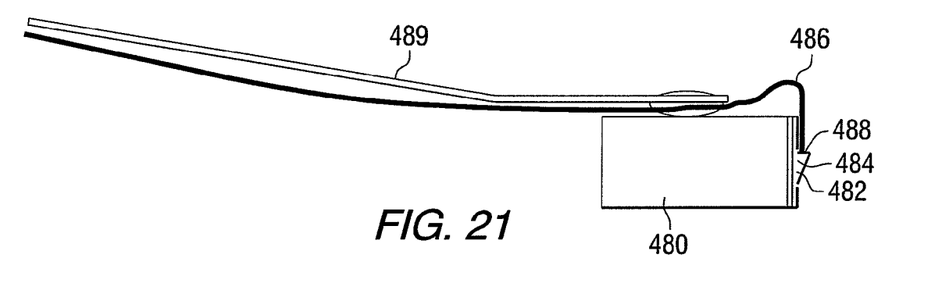

FIG. 21 shows a slider 480 having a trailing waveguide 482. In this example, the trailing waveguide includes a tapered portion 484, and a flexible waveguide 486 that directs lights into an end 488 of the trailing waveguide. The waveguide 486 is supported by, or integral with, an arm 489.

In each example illustrated in FIGS. 17 and 19-21, light can be transmitted to the slider using a flexible waveguide that is embedded in, or supported by an arm. The waveguide can be supported by, or integral with, an arm.

In various aspects, the invention provides a manufacturable and efficient method for coupling light from a laser diode and into a slider waveguide. One line-of-sight slider approach is to couple a laser diode into an optical fiber or flexible waveguide, and then couple that light from the fiber or flexible waveguide into the waveguide on the slider, which is part of the HAMR head.

In one example, the core of the slider trailing waveguide can be about 125 nm thick, but the core of the flexible waveguide or fiber would be much thicker (~5 µm). The thicker core in the flexible waveguide is due to the smaller difference in index of refraction (n) in the flexible waveguide as compared to the slider waveguide. In other examples, the mode index of the mode in the flexible waveguide and slider trailing waveguide are much different, due to both the waveguide dimensions and waveguide materials.

The implementations described above and other implementations are within the scope of the following claims.

What is claimed is:

1. An apparatus comprising:
   a slider mounted on an arm;
   a first waveguide including a first core guiding layer;
   a second waveguide mounted on the slider and including a second core guiding layer having a uniform thickness smaller than the thickness of the first core guiding layer; and
   a mirror formed on an end of the first core guiding layer and positioned to direct light from the first core guiding layer toward a grating positioned adjacent to the second core guiding layer for coupling light into the second core guiding layer; and
   a dielectric material forming a lens in a cavity adjacent to the mirror.

2. The apparatus of claim 1, further comprising:
   an antireflection coating positioned adjacent to an end of the first core guiding layer.

3. The apparatus of claim 1, further comprising:
   a third core guiding layer, wherein portions of the second core guiding layer and the third core guiding layer are positioned adjacent to each other.

4. The apparatus of claim 3, wherein the second core guiding layer has a thickness greater than a thickness of the third core guiding layer.

5. The apparatus of claim 4, further comprising:
   a grating positioned between the portions of the second core guiding layer and the third core guiding layer.

6. The apparatus of claim 3, wherein the portions of the second core guiding layer and the third core guiding layer are positioned such that light in the second core guiding layer is evanescently coupled to the third core guiding layer.

7. An apparatus comprising:
   a slider mounted on an arm;

a first waveguide including a first core guiding layer;

a second waveguide mounted on the slider and including a second core guiding layer, wherein the second core guiding layer includes a first portion having a first thickness, a second portion having a second thickness that is smaller than the first thickness, and a tapered portion between the first and second portions;

a grating positioned at an interface between an end of the first core guiding layer and the first portion of the second core guiding layer; and a mirror positioned to direct light from the first waveguide into the first portion of the second core guiding layer.

8. The apparatus of claim 7, wherein the light is coupled to an end of the first portion of the second core guiding layer.

9. The apparatus of claim 7, wherein a width of the tapered portion adjacent to the first portion is smaller than the width of the tapered portion adjacent to the second portion.

10. The apparatus of claim 7, wherein the second portion includes curved edges.

11. The apparatus of claim 10, wherein the curved edges have a parabolic shape to reflect light to a focal region.

12. The apparatus of claim 7, further comprising:

an antireflection coating adjacent to an end of the first waveguide.

* * * * *